(12) United States Patent
Chen

(10) Patent No.: US 7,025,150 B2
(45) Date of Patent: Apr. 11, 2006

(54) AIR INLET FOR PNEUMATIC TOOLS

(75) Inventor: Lung-Hui Chen, Zhubei (TW)

(73) Assignee: Sunmatch Industrial Co.,Ltd., Zhubei (TW)

( * ) Notice: Subject to any disclaimer, the term of this patent is extended or adjusted under 35 U.S.C. 154(b) by 0 days.

(21) Appl. No.: 10/840,286

(22) Filed: May 7, 2004

(65) Prior Publication Data

US 2005/0247465 A1  Nov. 10, 2005

(51) Int. Cl.
*B25B 9/00* (2006.01)
(52) U.S. Cl. .................. 173/169; 173/93.5; 173/168; 173/170
(58) Field of Classification Search .............. 173/168, 173/169, 170, 171, 93, 93.5
See application file for complete search history.

(56) References Cited

U.S. PATENT DOCUMENTS

| 4,109,735 | A | * | 8/1978 | Bent | .................. | 173/221 |
| 4,834,131 | A | * | 5/1989 | Austin | .................. | 137/115.26 |
| 5,417,294 | A | * | 5/1995 | Suher | .................. | 173/15 |
| 5,797,462 | A | * | 8/1998 | Rahm | .................. | 173/169 |
| 5,855,222 | A | * | 1/1999 | Jou | .................. | 137/223 |
| 5,901,794 | A | * | 5/1999 | Schoeps et al. | .................. | 173/93.5 |
| 6,644,419 | B1 | * | 11/2003 | Chen | .................. | 173/169 |
| 6,695,072 | B1 | * | 2/2004 | Izumisawa | .................. | 173/168 |
| 6,796,386 | B1 | * | 9/2004 | Izumisawa et al. | .................. | 173/93.5 |

FOREIGN PATENT DOCUMENTS

TW            333485 A      6/1998

* cited by examiner

*Primary Examiner*—Scott A. Smith
(74) *Attorney, Agent, or Firm*—Birch,Stewart,Kolasch & Birch,LLP

(57) ABSTRACT

An improved air inlet for pneumatic tools allows an air supply duct to supply compressed air smoothly to a pneumatic tool when in use at changing directions or angles without tangling with the pneumatic tool and affecting operation efficiency. The improved air inlet of the invention includes an air intake member which has one end connecting to the pneumatic tool and another end coupling with a rotary member in a turnable manner. The air supply duct is fastened to the rotary member and turnable therewith simultaneously to achieve the object desired.

9 Claims, 3 Drawing Sheets

AIR INLET FOR PNEUMATIC TOOLS

FIELD OF THE INVENTION

The present invention relates to an improved air inlet for pneumatic tools and particularly to an air inlet that allows air supply duct not tangling with the pneumatic tools.

BACKGROUND OF THE INVENTION

Conventional pneumatic tools generally are actuated by compressed air supplied through an air supply duct. The air supply duct is connected to an air intake connector to couple with a pneumatic tool in a detachable manner. The air intake connector generally is fastened to the handgrip of the pneumatic tool by screw coupling. Then the air supply duct is connected to a connection section of the air intake connector.

The conventional pneumatic tool mentioned above has a shortcoming. Namely the air supply duct usually is made from a hard and sturdy material and connected to the air intake connector and cannot be turned independently from the pneumatic tool. When the pneumatic tool is in use and turned, the air supply duct abutting the pneumatic tool often entangles with the pneumatic tool. As a result, operational maneuverability of the pneumatic tool decreases. Moreover, the tangling of the air supply duct reduces compressed air supply and affects operational quality of the pneumatic tool.

R.O.C. patent publication No. 333485 entitled "Apparatus, throttle air inlet and air intake sleeve for pneumatic tools" discloses a rotary air intake sleeve to couple a pneumatic tool with an air supply hose. The air intake sleeve has a first groove formed on the outer surface thereof to couple with a pin located in the handgrip of the pneumatic tool by turning. Such a construction enables the air intake sleeve to be turned in the handgrip about its own longitudinal axis so that when the air supply hose is connected to an outer end of the air intake sleeve the pneumatic tool may be turned independently from the air supply hose.

However, the structure set forth above has to form an aperture on the handgrip to receive the pin to couple with the complementary groove formed on the peripheral surface of the air intake sleeve. Such a design increases fabrication process and cost, also damages the structure of the pneumatic tool, and might cause leaking of compressed air.

SUMMARY OF THE INVENTION

The primary object of the present invention is to solve the aforesaid disadvantages. The invention provides an improved air inlet for pneumatic tools that allows the pneumatic tool to change direction or angle during operation without tangling with the air supply duct. Therefore compressed air may flow smoothly through the air supply duct without affecting the operational quality of the pneumatic tool. The handgrip of the pneumatic tool does not need to form an aperture and the structure of the pneumatic tool may be maintained intact, and leaking of compressed air may be prevented.

In order to achieve the foregoing object, the improved air inlet for pneumatic tools according to the invention includes an air intake member which has one end connecting to a pneumatic tool and another end coupling with a rotary member in a turnable manner. The rotary member may be turned relative to the air intake member so that when the pneumatic tool is in operation the air supply duct coupled with the rotary member also may be turned at the same time. As a result, tangling of the air supply duct may be prevented and operational maneuverability and convenience of the pneumatic tool increase.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
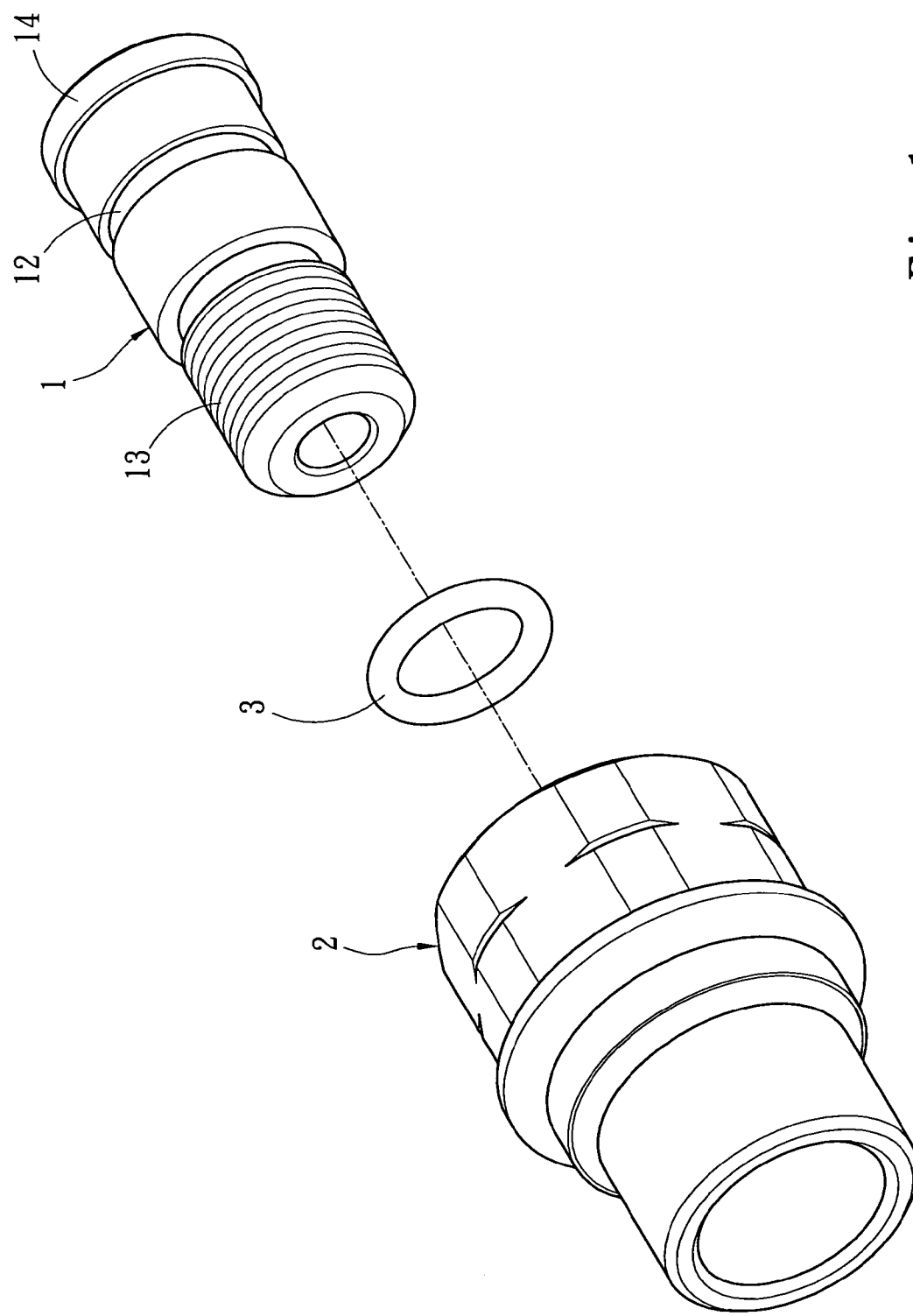
FIG. 1 is an exploded view of the present invention.
Figure 2:
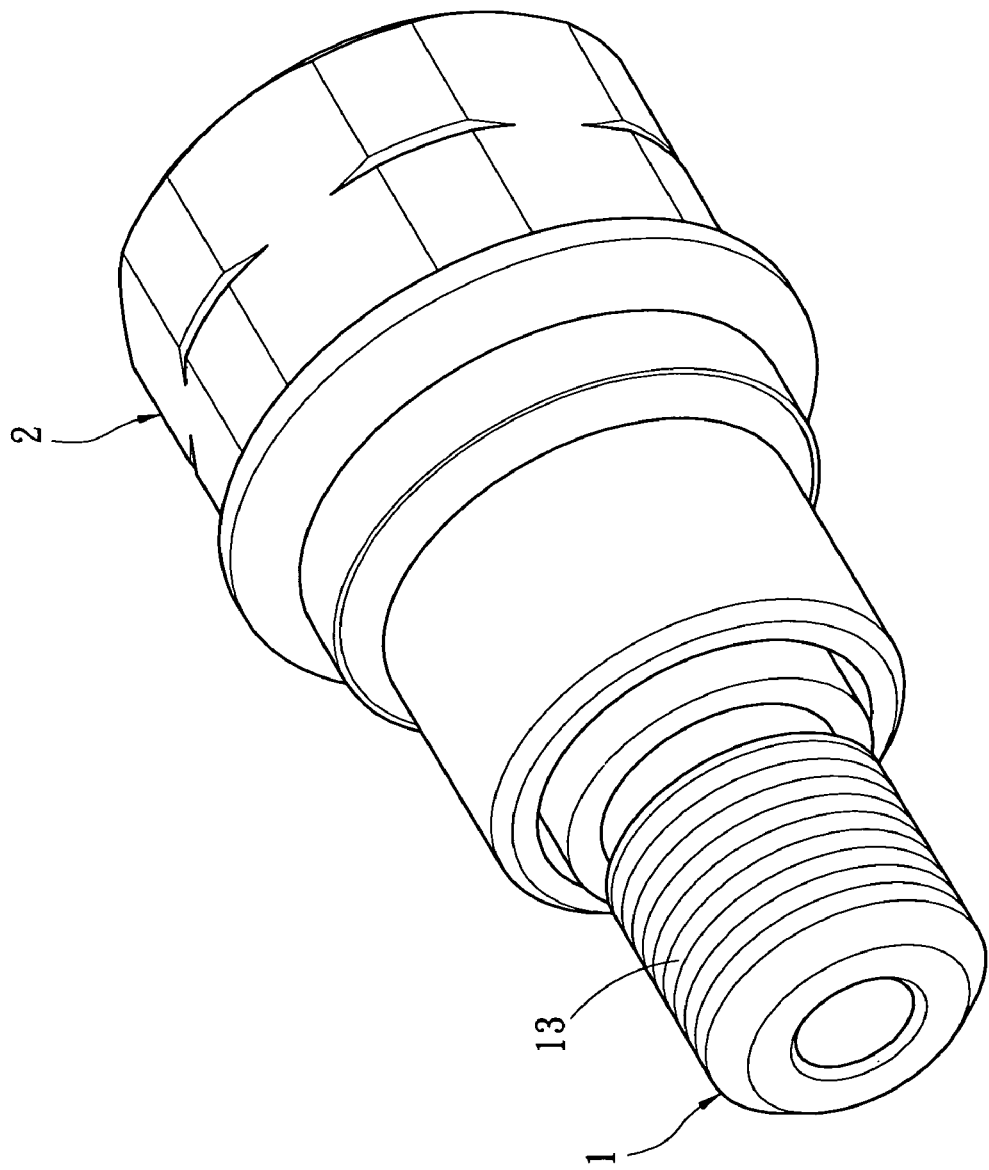
FIG. 2 is a perspective view of the present invention.
Figure 3:
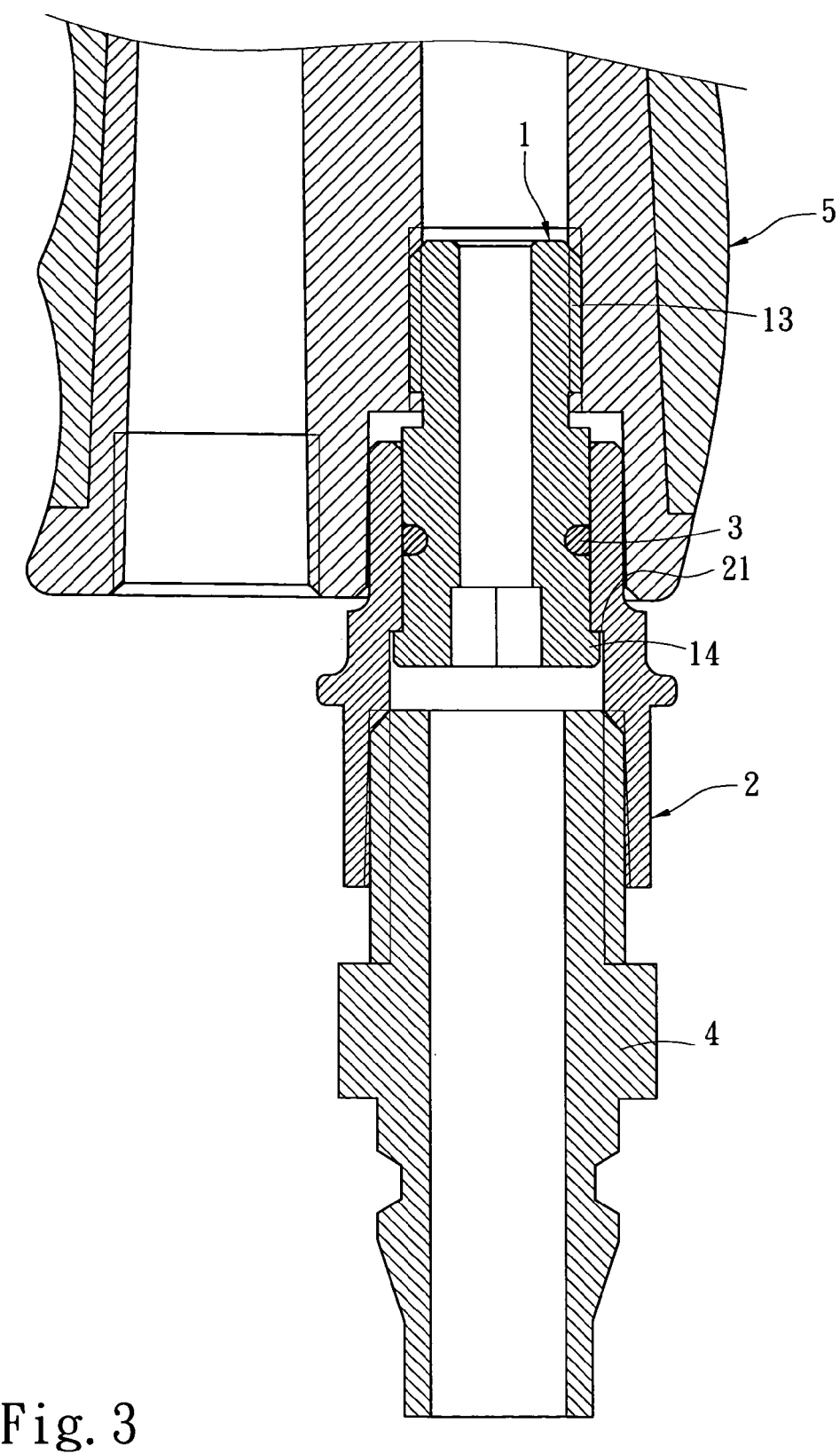
FIG. 3 is a sectional view of the present invention coupled with a pneumatic tool.

Please referring to FIGS. 1, 2 and 3, the air inlet for pneumatic tools according to the present invention includes an air intake member 1 which is circular and hollow to form a flow passage for compressed air. The air intake member 1 has an annular groove 12 to couple with a circular washer 3 to prevent leaking of compressed air that would affect the operational quality of the pneumatic tool.

The invention also includes a rotary member 2 which is circular and hollow. It has a second annular bulged ring 21 formed on the inner periphery. The air intake member 1 has a first annular bulged ring 14 corresponding to the second annular bulged ring 21. The air intake member 1 may be inserted into the rotary member 2 through one end thereof. And a thread section 13 of the air intake member 1 runs though the rotary member 2 and exposed outside thereof with the first annular bulged ring 14 of the air intake member 1 pressing the second annular bulged ring 21 of the rotary member 2, thus the rotary member 2 may be turned relative to the air intake member 1.

The pneumatic tool has a handgrip 5 which has another thread section to couple with the thread section 13 of the air intake member 1 so that the air intake member 1 may be fastened to the pneumatic tool by screw coupling. Meanwhile the air supply duct 4 may be fastened to the rotary member 2. When the pneumatic tool is in operation, its direction or angle may be changed according to the work piece position, direction and alterations of environment. The rotary member 2 can turn 360 degrees about the axis of the air intake member 1, and the air supply duct 4 can also turn with the rotary member 2 at the same time. Thus tangling of the air supply duct 4 with the pneumatic tool may be avoided to increase the operational maneuverability and convenience of the pneumatic tool.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:
1. An air inlet for pneumatic tools to supply compressed air through an air supply duct to a pneumatic tool to actuate the pneumatic tool, comprising:
an air intake member and a rotary member, the air intake member having one end connectable to the pneumatic tool and another end connectable with the rotary member in a turnable manner, the rotary member having one end fastening to the air supply duct so that the air supply duct is turnable with the rotary member simultaneously, the air intake member having a first annular bulged ring, the rotary member having a second annular bulged ring, the air intake member extending through the rotary member such that the first annular bulged ring presses against the second annular bulged ring, and a single air passage being provided through the air intake member and the rotary member.

2. The air inlet for pneumatic tools of claim 1, wherein the air intake member has an annular groove to couple with a circular washer to prevent the compressed air from leaking outside the pneumatic tool.

3. The air inlet for pneumatic tools of claim 1, wherein the air intake member has a thread section, the pneumatic tool having another thread section matching the thread section to allow the air intake member to be engaged with the pneumatic tool by screw coupling.

4. The air inlet for pneumatic tools of claim 1, wherein the first annular bulged ring of the air intake member directly abuts against the second annular bulged ring of the rotary member.

5. The air inlet for pneumatic tools of claim 1, wherein the rotary member has a portion of the single air passage and wherein the air intake member has an outer diameter which is less than an inner diameter of the portion of the air passage of the rotary member except for the diameter of the first annular bulged ring of the air intake member such that the rotary member can pass through the air intake member except for the first annular bulged ring.

6. The air inlet for pneumatic tools of claim 5, wherein the air intake member also has a portion of the single air passage, the portion of the air passage in the rotary member being linearly aligned with the portion of the air passage in the air intake member.

7. The air inlet for pneumatic tools of claim 1, wherein the rotary member has a portion of the single air passage and the air intake member also has a portion of the single air passage, the portion of the air passage in the rotary member being linearly aligned with the portion of the air passage in the air intake member.

8. The air inlet for pneumatic tools of claim 1, wherein the air intake member fits inside the rotary member.

9. The air inlet for pneumatic tools of claim 8, wherein a largest outermost diameter of the air intake member is found at the first annular bulged ring, the first annular bulged ring directly contacting the second annular bulged ring.

* * * * *